US012800865B2

(12) United States Patent
Meng et al.

(10) Patent No.: US 12,800,865 B2
(45) Date of Patent: Nov. 17, 2026

(54) OPTICAL ELEMENT DRIVING MECHANISM

(71) Applicant: Actutek Corporation, Taoyuan City (TW)

(72) Inventors: Jui-Che Meng, Taoyuan City (TW); Pai-Jui Cheng, Taoyuan City (TW); Yung-Yun Chen, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 134 days.

(21) Appl. No.: 18/894,733

(22) Filed: Sep. 24, 2024

(65) Prior Publication Data

US 2025/0102884 A1 Mar. 27, 2025

Related U.S. Application Data

(60) Provisional application No. 63/584,983, filed on Sep. 25, 2023.

(51) Int. Cl.

| | |
|---|---|
| ***G02B 7/02*** | (2021.01) |
| ***G02B 5/00*** | (2006.01) |
| ***G02B 7/09*** | (2021.01) |
| ***G02B 27/64*** | (2006.01) |
| ***G03B 3/10*** | (2021.01) |
| ***G03B 7/095*** | (2021.01) |
| ***G03B 9/42*** | (2021.01) |
| ***G03B 11/04*** | (2021.01) |
| ***G06F 1/16*** | (2006.01) |
| ***H02K 41/035*** | (2006.01) |

(52) U.S. Cl.
CPC ............... *G02B 7/02* (2013.01); *G02B 5/005* (2013.01); *G02B 7/09* (2013.01); *G02B 27/64* (2013.01); *G03B 3/10* (2013.01); *G03B 7/095* (2013.01); *G03B 9/42* (2013.01); *G03B 11/043* (2013.01); *G06F 1/1677* (2013.01); *H02K 41/0354* (2013.01)

(58) Field of Classification Search
CPC . G02B 7/02; G02B 5/005; G02B 7/08; G02B 7/09; G02B 27/64; G02B 27/646; G03B 9/42; G03B 30/00; G03B 3/10; G03B 7/095; G03B 11/043; G03B 2205/0069; G06F 1/1677; H02K 41/0354; H02K 41/0356
See application file for complete search history.

(56) References Cited

U.S. PATENT DOCUMENTS

2022/0121025 A1* 4/2022 Wang ........................ G02B 7/04
2023/0082845 A1* 3/2023 Wang ..................... G02B 5/005
348/374

* cited by examiner

*Primary Examiner* — Kelly L Jerabek
(74) *Attorney, Agent, or Firm* — MUNCY, GEISSLER, OLDS & LOWE, P.C.

(57) ABSTRACT

An optical element driving mechanism includes a fixed assembly, a first movable part and a driving assembly. The first movable part is configured to be connected to a first optical element, and the first movable part is movable relative to the fixed assembly. The driving assembly is configured to drive the first movable part to move relative to the fixed assembly.

19 Claims, 16 Drawing Sheets

OPTICAL ELEMENT DRIVING MECHANISM

CROSS REFERENCE TO RELATED APPLICATIONS

This application claims the benefit of U.S. Provisional Application No. 63/584,983, filed on Sep. 25, 2023, the entirety of which is incorporated by reference herein.

BACKGROUND OF THE INVENTION

Field of the Disclosure

The present disclosure relates to an optical element driving mechanism, and in particular it relates to an optical element driving mechanism with a shutter structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice for consumers.

BRIEF SUMMARY OF THE INVENTION

Accordingly, one objective of the present disclosure is to provide an optical element driving mechanism to solve the above problems.

According to some embodiments of the disclosure, an optical element driving mechanism is provided that includes a fixed assembly, a first movable part and a driving assembly. The first movable part is configured to be connected to a first optical element, and the first movable part is movable relative to the fixed assembly. The driving assembly is configured to drive the first movable part to move relative to the fixed assembly.

According to some embodiments, the optical element driving mechanism further includes a second movable part configured to be connected to a second optical element, and the second movable part is movable relative to the first movable part. When a driving signal is input to the driving assembly, the driving assembly generates a first driving force to the first movable part, and the driving assembly generates a second driving force to the second movable part at the same time. The fixed assembly includes an outer frame and a base. The outer frame is fixedly connected to the base. The outer frame has a first opening and a second opening. The first opening and the second opening are arranged along a first axis.

According to some embodiments, the first optical element has a first base portion and a first blocking portion. The first base portion extends along the first axis. A first open slot is formed on the first base portion. The first blocking portion extends from the first base portion along a second axis. The first blocking portion extends from the first base portion in a first extending direction.

According to some embodiments, the second optical element has a second base portion and a second blocking portion. The second base portion extends along the first axis. A second open slot is formed on the second base portion. A length of the first open slot is greater than a length of the second open slot. The second blocking portion extends from the second base portion along the second axis. The second blocking portion extends from the second base portion in a second extending direction. The second extending direction is opposite to the first extending direction. The first movable part is configured to move along the first axis so that the first blocking portion selectively blocks the first opening. The second movable part is configured to move along the first axis so that the second blocking portion selectively blocks the second opening.

According to some embodiments, the optical element driving mechanism further includes a positioning assembly. The positioning assembly and the driving assembly are arranged along the first axis. When viewed along a third axis, the first movable part and the second movable part are located on opposite sides of the driving assembly. The third axis, the second axis and the first axis are perpendicular to each other. The positioning assembly selectively positions the first movable part in a first position and positions the second movable part in a third position. The positioning assembly selectively positions the first movable part in a second position and positions the second movable part in the third position. The positioning assembly selectively positions the first movable part in the first position and positions the second movable part in a fourth position. The positioning assembly selectively positions the first movable part in the second position and positions the second movable part in the fourth position.

According to some embodiments, when the positioning assembly positions the first movable part in the first position, the first blocking portion does not block the first opening. When the positioning assembly positions the first movable part in the second position, the first blocking portion blocks the first opening. When the positioning assembly positions the second movable part in the third position, the second blocking portion does not block the second opening. When the positioning assembly positions the second movable part in the fourth position, the second blocking portion blocks the second opening.

According to some embodiments, the driving assembly includes a first coil, a first magnetically conductive element, a first magnetic element and a second magnetic element. The first magnetic element corresponds to the first coil and is disposed on the first movable part. The second magnetic element corresponds to the first coil and is disposed on the second movable part. The first magnetically conductive element corresponds to the first coil. The first magnetically conductive element has magnetically conductive material and has a long strip-shaped structure. The first coil is wound on the first magnetically conductive element.

According to some embodiments, the positioning assembly includes a first positioning element, a second coil and a second magnetically conductive element. The first positioning element is movably disposed on the base. The second coil corresponds to the second magnetically conductive element. The second magnetically conductive element has a clamp-shaped structure. The second coil is wound on the second magnetically conductive element.

According to some embodiments, the first positioning element has magnetically conductive material. When the second coil is energized, the first positioning element rotates around a first rotating axis relative to the second magnetically conductive element and the base. The first positioning element has a first central portion and a first positioning portion. The first positioning portion is disposed on the first central portion. The first positioning portion has a long strip-shaped structure configured to selectively stop the first movable part. The base further has a first positioning shaft which is inserted into the first central portion.

According to some embodiments, the positioning assembly further includes a second positioning element, a third coil and a third magnetically conductive element. The second positioning element is movably disposed on the base. The third coil corresponds to the third magnetically conductive element. The third magnetically conductive element has a clamp-shaped structure. The third coil is wound on the third magnetically conductive element.

According to some embodiments, the second positioning element has magnetically conductive material. When the third coil is energized, the second positioning element rotates around a second rotating axis relative to the third magnetically conductive element and the base. The second positioning element has a second central portion, a second positioning portion and a third positioning portion. The second positioning portion and the third positioning portion are disposed on one side of the second central portion and face the second movable part. The base has a second positioning shaft which is inserted into the second central portion.

According to some embodiments, the second positioning shaft is located between the second positioning portion and the third positioning portion. The second positioning portion and the third positioning portion have arc structures configured to selectively stop the second movable part. The base further has two arc grooves, and the second positioning portion and the third positioning portion respectively pass through the two arc grooves.

According to some embodiments, the first movable part has a first stop portion and a second stop portion. When the first movable part is located in the first position, and when the first positioning element is located in a first lock position, the first positioning portion is in contact with the first stop portion. The second movable part has a third stop portion and a fourth stop portion. When the second movable part is located in the third position, and when the second positioning element is located in a second lock position, the second positioning portion is in contact with the third stop portion.

According to some embodiments, when the first coil is energized, the first magnetic element is configured to drive the first movable part to move along the first axis. When the second coil is energized, the first positioning element rotates from the first lock position to a first release position, so that the first movable part moves from the first position to the second position. When the first coil is energized, the second magnetic element is configured to drive the second movable part to move along the first axis. When the third coil is energized, the second positioning element rotates from the second lock position to a second release position, so that the second movable part moves from the third position to the fourth position.

According to some embodiments, when the first movable part is located in the second position, and when the first positioning element is located in the first lock position, the first positioning portion is in contact with the second stop portion. When the second movable part is located in the fourth position, and when the second positioning element is located in the second lock position, the third positioning portion is in contact with the fourth stop portion.

According to some embodiments, each of the first stop portion to the fourth stop portion has a slope structure. The slope structure of the first stop portion is parallel to the slope structure of the third stop portion. The slope structure of the first stop portion is not parallel to the slope structure of the second stop portion. The slope structure of the second stop portion is parallel to the slope structure of the fourth stop portion. The slope structure of the third stop portion is not parallel to the slope structure of the fourth stop portion.

According to some embodiments, the first positioning element is disposed on a first supporting portion of the base. The first central portion does not penetrate the first supporting portion. When viewed along the second axis, the first central portion is exposed from the first supporting portion.

According to some embodiments, the second positioning element is disposed on a second supporting portion of the base. A portion of the second positioning element passes through the second supporting portion. When viewed along the second axis, the second positioning portion and the third positioning portion are exposed from the second supporting portion.

According to some embodiments, the outer frame further has a third opening, and the second opening is located between the first opening and the third opening. The second optical element further has a third blocking portion. The third blocking portion extends from the second base portion along the second axis. The third blocking portion of the second optical element selectively blocks the third opening. When the positioning assembly positions the second movable part in the third position, the third blocking portion does not block the third opening. When the positioning assembly positions the second movable part in the fourth position, the third blocking portion blocks the third opening.

According to some embodiments, the second optical element has a fourth blocking portion. The fourth blocking portion extends from the second base portion along the second axis. When viewed along the third axis, the second blocking portion is located between the third blocking portion and the fourth blocking portion. When the first movable part is located in the second position and the second movable part is located in the fourth position, the fourth blocking portion overlaps the first blocking portion and the first opening. When viewed along the first axis, the fourth blocking portion does not overlap the first blocking portion.

The present disclosure provides an optical element driving mechanism, which includes a fixed assembly, a first movable part, a second movable part and a driving assembly. The driving assembly is configured to drive the first movable part and the second movable part to move relative to the fixed assembly, so that the first movable part drives the first optical element to move to selectively shield the first opening of the fixed assembly, and the second movable part drives the second optical element to move to selectively shield the second opening and the third opening of the fixed assembly.

In the present disclosure, the first positioning element and the second positioning element can act independently, so that the first movable part and the second movable part can move along the first axis alone or together. Based on this configuration, the optical element driving mechanism can be used in four different usage scenarios to meet the different needs of users.

Based on the above configuration, the optical element driving mechanism can be used in various usage scenarios. In addition, because the first movable part and the second movable part share the same driving assembly, the overall volume of the optical element driving mechanism can be reduced to achieve miniaturization. In addition, because the multiple blocking portions are distributed on two movable parts, the weight of a single movable part can be reduced, so that the movement of the two movable parts can be more stable.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
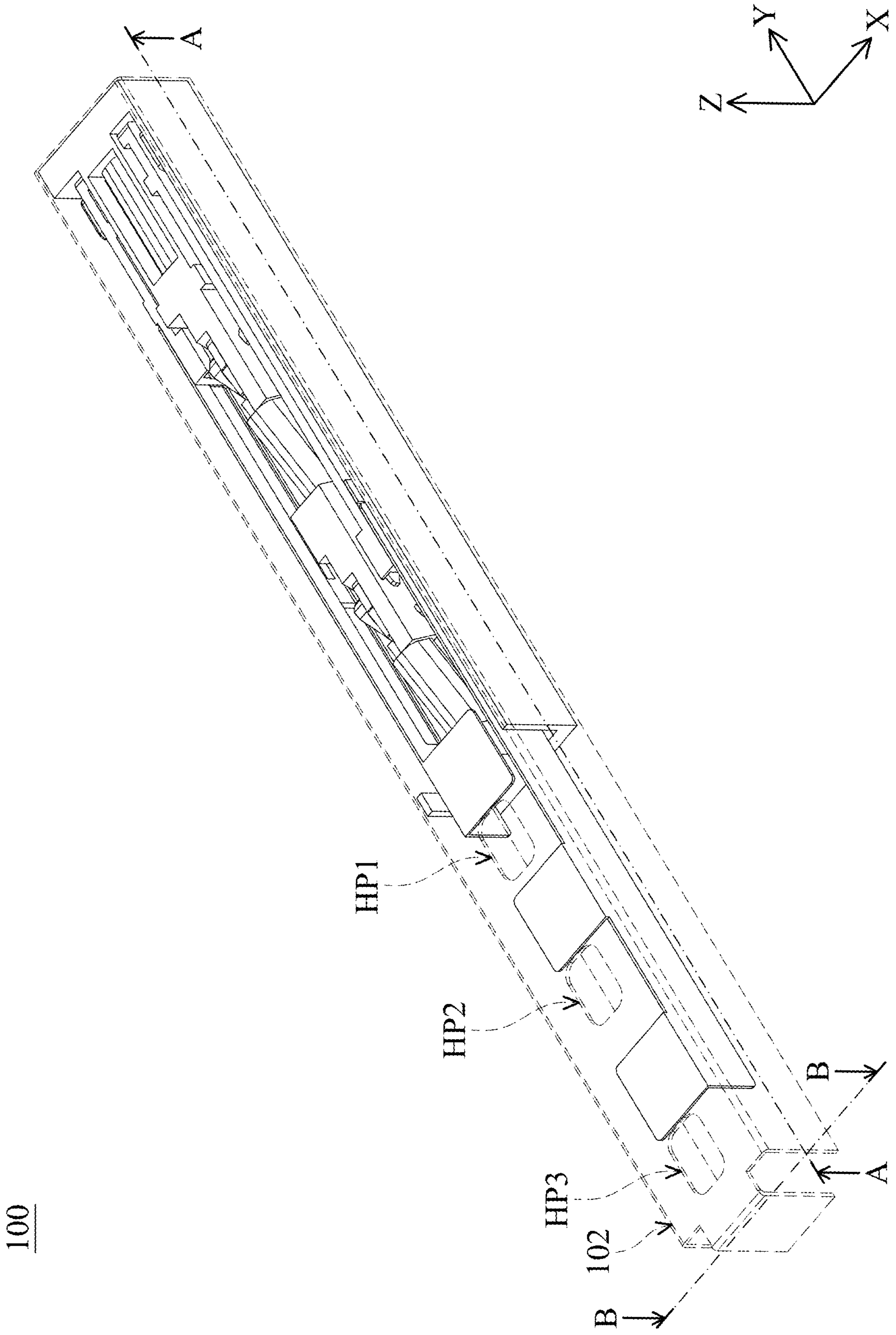
FIG. 1 is a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, “vertical,” “above,” “over,” “below,”, “bottom,” etc. as well as derivatives thereof (e.g., “downwardly,” “upwardly,” etc.) are used in the present disclosure for ease of description of one feature’s relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as “first”, “second”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
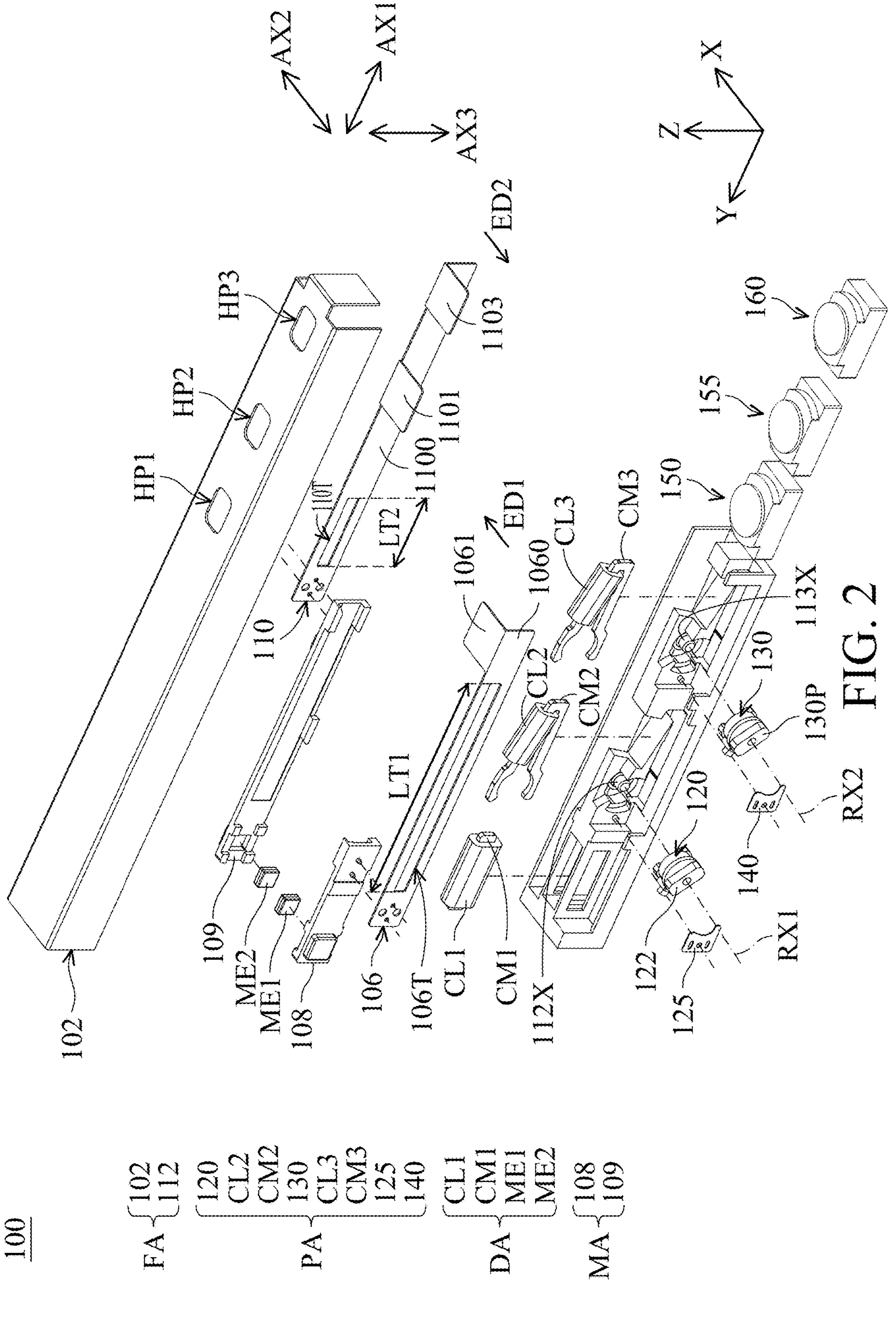
FIG. 2 is an exploded diagram of the optical element driving mechanism 100 according to an embodiment of the present disclosure.
Figure 3:
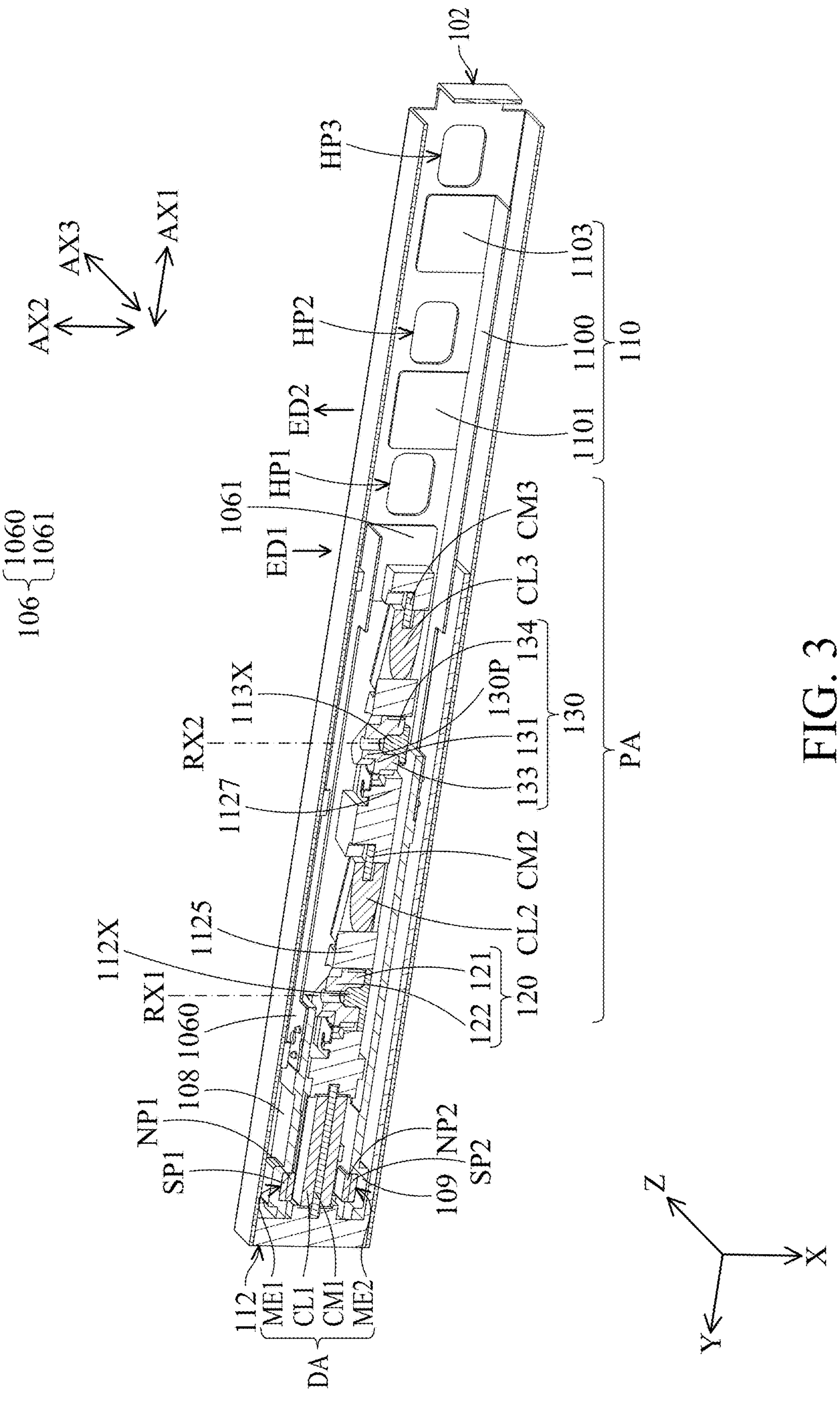
FIG. 3 is a cross-sectional view of the optical element driving mechanism 100 along line A-A in FIG. 1 according to an embodiment of the present disclosure.

Please refer to FIG. 1 to FIG. 3. FIG. 1 is a schematic diagram of an optical element driving mechanism 100 according to an embodiment of the present disclosure, FIG. 2 is an exploded diagram of the optical element driving mechanism 100 according to an embodiment of the present disclosure, and FIG. 3 is a cross-sectional view of the optical element driving mechanism 100 along line A-A in FIG. 1 according to an embodiment of the present disclosure. The optical element driving mechanism 100 can be an optical camera module and can be configured to hold and drive at least one optical element. The optical element driving mechanism 100 can be installed in various electronic devices or portable electronic devices, such as a smartphone or a notebook computer, for allowing a user to perform the image capturing function.

In this embodiment, the optical element driving mechanism 100 may include a fixed assembly FA, a movable assembly MA and a driving assembly DA. The movable assembly MA is movably connected to the fixed assembly FA. The driving assembly DA is configured to drive the movable assembly MA to move relative to the fixed assembly FA.

In this embodiment, as shown in FIG. 2, the fixed assembly FA includes an outer frame 102 and a base 112, and the movable assembly MA may include a first movable part 108 and a second movable part 109. The first movable part 108 is configured to be connected to a first optical element 106, and the first movable part 108 is movable relative to the fixed assembly FA. Similarly, the second movable part 109 is configured to be connected to a second optical element 110, and the second movable part 109 is movable relative to the first movable part 108.

The driving assembly DA is configured to drive the first movable part 108 and the second optical element 110 to move relative to the fixed assembly FA. In this embodiment, the first optical element 106 and the second optical element 110 can serve a light shield plate or a shutter, but they are not limited thereto. In other embodiments, the first optical element 106 and the second optical element 110 can also serve as optical filters or apertures.

In this embodiment, the first optical element 106 is detachably connected to the first movable part 108, and the second optical element 110 is detachably connected to the second movable part 109, but they are not limited thereto. For example, in other embodiments, the first optical element 106 and the second optical element 110 can be fixedly connected to the first movable part 108 and the second movable part 109 respectively by insert molding technology.

For example, the first movable part 108 and the second movable part 109 can be made of non-metal material, such as plastic material, and the first optical element 106 and the second optical element 110 can be made of metal material, but they are not limited thereto.

Furthermore, the outer frame 102 is fixedly connected to the base 112, and the outer frame 102 can be combined with the base 112 to cooperatively accommodate the movable assembly MA and the driving assembly DA. As shown in FIG. 2, the aforementioned outer frame 102 has a first opening HP1, a second opening HP2 and a third opening HP3. The first opening HP1, the second opening HP2 and the third opening HP3 are arranged along a first axis AX1, and the second opening HP2 is located between the first opening HP1 and the third opening HP3. It should be noted that, in order to clearly represent the structural details, the outer frame 102 in FIG. 1 and some components in subsequent figures are represented by dotted lines, but it does not mean that these components do not exist.

A first optical module 150, a second optical module 155 and a third optical module 160 are accommodated next to the base 112. The first optical module 150 is, for example, a camera module, the second optical module 155 is, for example, an infrared sensing module, and the third optical module 160 is, for example, an infrared light source module, but they are not limited thereto.

For example, the first optical module 150 can receive an external light through the first opening HP1 to generate a digital image signal, the second optical module 155 can sense infrared light through the second opening HP2, and the third optical module 160 can emits infrared light through the third opening HP3.

As shown in FIG. 2 and FIG. 3, the first optical element 106 has a first base portion 1060 and a first blocking portion 1061. The first base portion 1060 extends along the first axis AX1, and the first blocking portion 1061 extends from the first base portion 1060 along a second axis AX2. Specifically, the first blocking portion 1061 extends from the first base portion 1060 in a first extending direction ED1.

Similarly, the second optical element 110 has a second base portion 1100, a second blocking portion 1101 and a third blocking portion 1103. The second base portion 1100 extends along the first axis AX1, the second blocking portion 1101 extends from the second base portion 1100 along the second axis AX2, and the third blocking portion 1103 also extends from the second base portion 1100 along the second axis AX2.

Specifically, the second blocking portion 1101 and the third blocking portion 1103 extend from the second base portion 1100 in a second extending direction ED2, and the second extending direction ED2 is opposite to the first extending direction ED1.

The first movable part 108 is configured to move along the first axis AX1 so that the first blocking portion 1061 selectively blocks the first opening HP1. Similarly, the second movable part 109 is configured to move along the first axis AX1 so that the second blocking portion 1101 selectively blocks the second opening HP2 and the third blocking portion 1103 selectively blocks the third opening HP3.

Furthermore, as shown in FIG. 2, a first open slot 106T is formed on the first base portion 1060, a second open slot 110T is formed on the second base portion 1100, and the length LT1 of the first open slot 106T is greater than the length LT2 of the second open slot 110T. Based on the configuration of the first open slot 106T and the second open slot 110T, the overall weight of the first optical element 106 and the second optical element 110 can be reduced so as to achieve the purpose of lightweighting.

In this embodiment, the optical element driving mechanism 100 further includes a positioning assembly PA configured to position the first movable part 108 and the second movable part 109. As shown in FIG. 3, the positioning assembly PA and the driving assembly DA are arranged along the first axis AX1.

Furthermore, as shown in FIG. 3, when viewed along a third axis AX3 (the Z-axis), the first movable part 108 and the second movable part 109 are located on opposite sides of the driving assembly DA. The third axis AX3, the first axis AX1 and the second axis AX2 are perpendicular to each other.

In this embodiment, the driving assembly DA may include a first coil CL1, a first magnetically conductive element CM1, a first magnetic element ME1, and a second magnetic element ME2. The first magnetic element ME1 corresponds to the first coil CL1 and is disposed on the first movable part 108, and the second magnetic element ME2 corresponds to the first coil CL1 and is disposed on the second movable part 109.

The first magnetically conductive element CM1 is disposed at the base 112 and corresponds to the first coil CL1. The first magnetically conductive element CM1 is made of a magnetically permeable material and has a long strip-shaped structure, and the first coil CL1 is wound on the first magnetically conductive element CM1.

When a driving signal is input to the driving assembly DA, the driving assembly DA generates a first driving force to the first movable part 108, and the driving assembly DA generates a second driving force to the second movable part 109 at the same time. The first driving force and the second driving force are, for example, electromagnetic driving forces, but they are not limited thereto.

Specifically, when the first coil CL1 is energized, it act with the first magnetic element ME1 and the second magnetic element ME2 respectively to generate the aforementioned first driving force and the second driving force to respectively drive the first movable part 108 and the second movable part 109 to move back and forth along the first axis AX1.

Furthermore, the positioning assembly PA may include a first positioning element 120, a second coil CL2 and a second magnetically conductive element CM2. The first positioning element 120 is movably disposed on the base 112, and the second coil CL2 corresponds to the second magnetically conductive element CM2. For example, in this embodiment, the second magnetically conductive element CM2 has a clamp-shaped structure, and the second coil CL2 is wound on one side of the second magnetically conductive element CM2.

Furthermore, the first positioning element 120 has a magnetically conductive material, so that when the second coil CL2 is energized, the first positioning element 120 acts with the second coil CL2 to be driven to rotate around a first rotating axis RX1 relative to the second magnetically conductive element CM2 and the base 112. The first rotating axis RX1 is parallel to the second axis AX2. In addition, as shown in FIG. 2, the positioning assembly PA may further include a first blocking element 125 configured to block the first positioning element 120 so as to prevent the first positioning element 120 from being separated from the base 112 during rotation.

Similarly, the positioning assembly PA further includes a second positioning element 130, a third coil CL3 and a third magnetically conductive element CM3. The second positioning element 130 is movably disposed on the base 112, and the third coil CL3 corresponds to the third magnetically conductive element CM3. For example, the third magnetically conductive element CM3 may have a clamp-shaped structure, and the third coil CL3 is wound on the third magnetically conductive element CM3.

Furthermore, the second positioning element 130 has a magnetically conductive material, so that when the third coil CL3 is energized, the second positioning element 130 acts with the third coil CL3 and is driven to rotates around a second rotating axis RX2 relative to the third magnetically conductive element CM3 and the base 112. The second rotating axis RX2 is parallel to the second axis AX2. In addition, as shown in FIG. 2, the positioning assembly PA may further include a second blocking element 140 configured to block the second positioning element 130 to prevent the second positioning element 130 from being separated from the base 112 during rotation.

Figure 4:
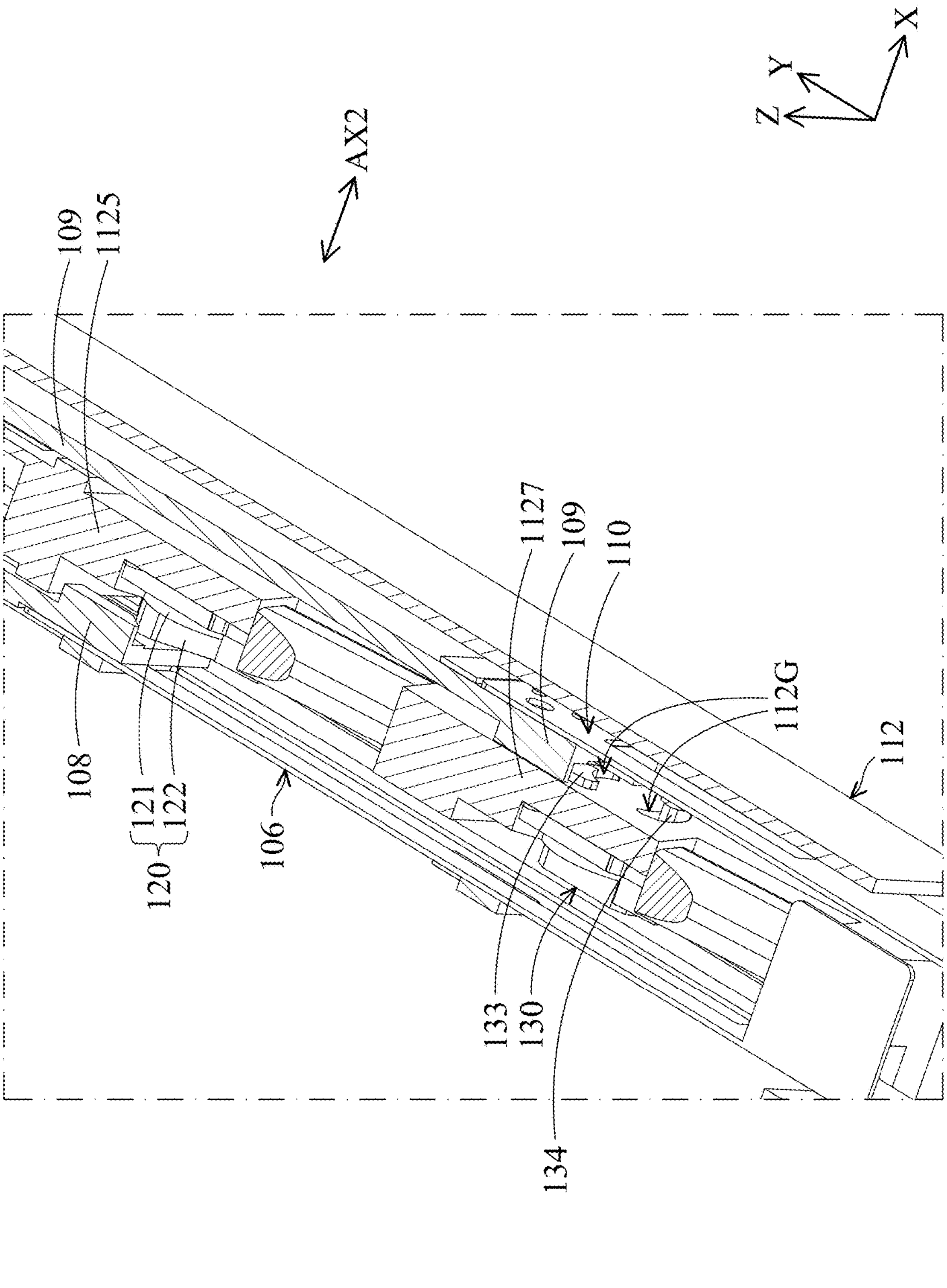
FIG. 4 is a three-dimensional cross-sectional view of the optical element driving mechanism 100 along the line B-B in FIG. 1 according to an embodiment of the present disclosure.

Next, please refer to FIG. 2 to FIG. 4. FIG. 4 is a three-dimensional cross-sectional view of the optical element driving mechanism 100 along the line B-B in FIG. 1 according to an embodiment of the present disclosure. As shown in FIG. 3 and FIG. 4, the first positioning element 120 may have a first central portion 121 and a first positioning portion 122.

The first positioning portion 122 is disposed on the first central portion 121, and the first positioning portion 122 may have a long strip-shaped structure configured to selectively stop the first movable part 108. Furthermore, as shown in FIG. 3, the base 112 may further have a first positioning shaft 112X which is inserted into the first central portion 121 so that the first positioning element 120 can rotate around the first positioning shaft 112X.

Similarly, the second positioning element 130 has an upper side portion 130P, a second central portion 131, a second positioning portion 133 and a third positioning portion 134. The upper side portion 130P is disposed on one side of the second central portion 131, and the second positioning portion 133 and the third positioning portion 134 are disposed on the other side of the second central portion 131 and face the second movable part 109. Furthermore, the base 112 may have a second positioning shaft 113X which is inserted into the second central portion 131, and the second positioning shaft 113X is located between the second positioning portion 133 and the third positioning portion 134. In addition, the upper side portion 130P may have the same shape as the first positioning portion 122, but the upper side portion 130P is not in contact with the first movable part 108.

As shown in FIG. 4, each of the second positioning portion 133 and the third positioning portion 134 may have an arc structure configured to selectively stop the second movable part 109, and the base 112 may correspondingly has two arc grooves 112G. The second positioning portion 133 and the third positioning portion 134 can respectively pass through the two arc grooves 112G. The size of the arc groove 112G is larger than each of the second positioning portion 133 and the third positioning portion 134, so that the second positioning portion 133 and the third positioning portion 134 can move along the two arc grooves 112G respectively.

As shown in FIG. 3 and FIG. 4, the first positioning element 120 is disposed on a first supporting portion 1125 of the base 112, and the first central portion 121 does not penetrate the first supporting portion 1125. Specifically, the first central portion 121 is covered by the first supporting portion 1125 when viewed along the second axis AX2. That is, when viewed along the second axis AX2, the first central portion 121 is not exposed from the first supporting portion 1125.

On the other hand, the second positioning element 130 is disposed on a second supporting portion 1127 of the base 112, and a portion of the second positioning element 130 passes through the second supporting portion 1127. Specifically, the second positioning portion 133 and the third positioning portion 134 pass through the second supporting portion 1127. Therefore, as shown in FIG. 4, when viewed along the second axis AX2, the second positioning portion 133 and the third positioning portion 134 are exposed from the second supporting portion 1127.

Figure 5:
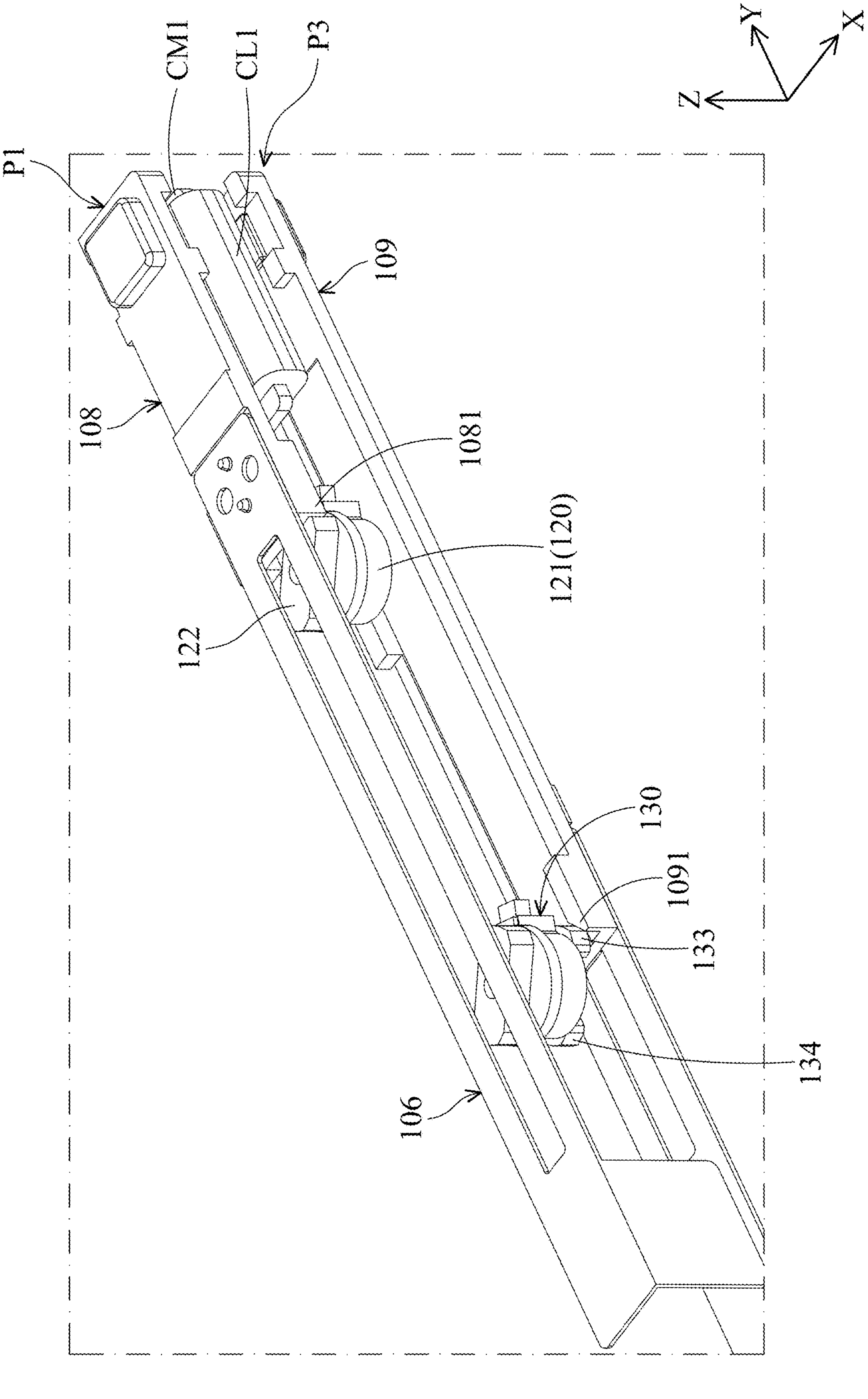
FIG. 5 is a perspective view illustrating that the first positioning element 120 positions the first movable part 108 in a first position P1 and the second positioning element 130 positions the second movable part 109 in a third position P3 according to an embodiment of the present disclosure.
Figure 6:
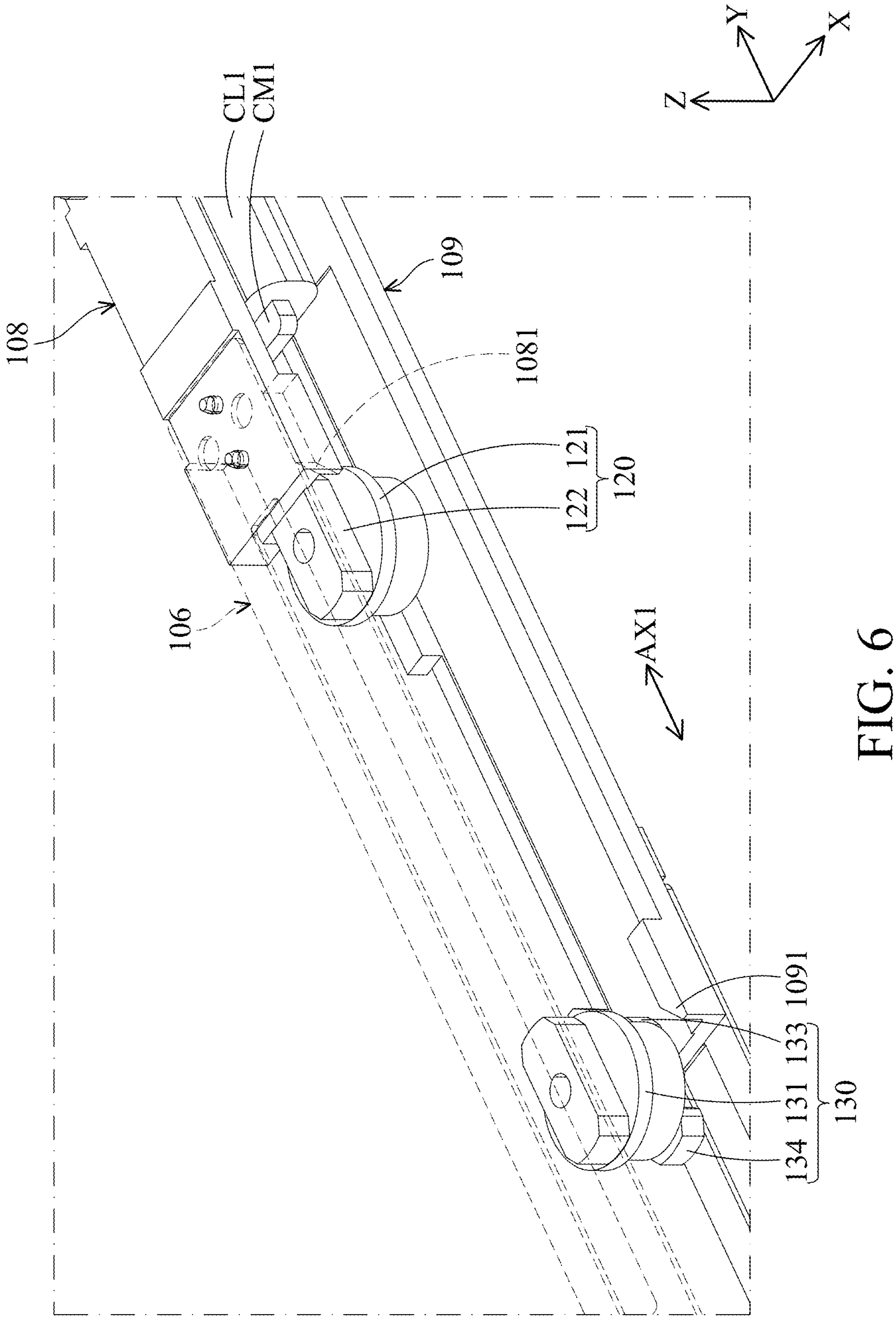
FIG. 6 is a perspective view illustrating that the first positioning element 120 is located in a first release position and the second positioning element 130 is located in a second release position according to an embodiment of the present disclosure.
Figure 7:
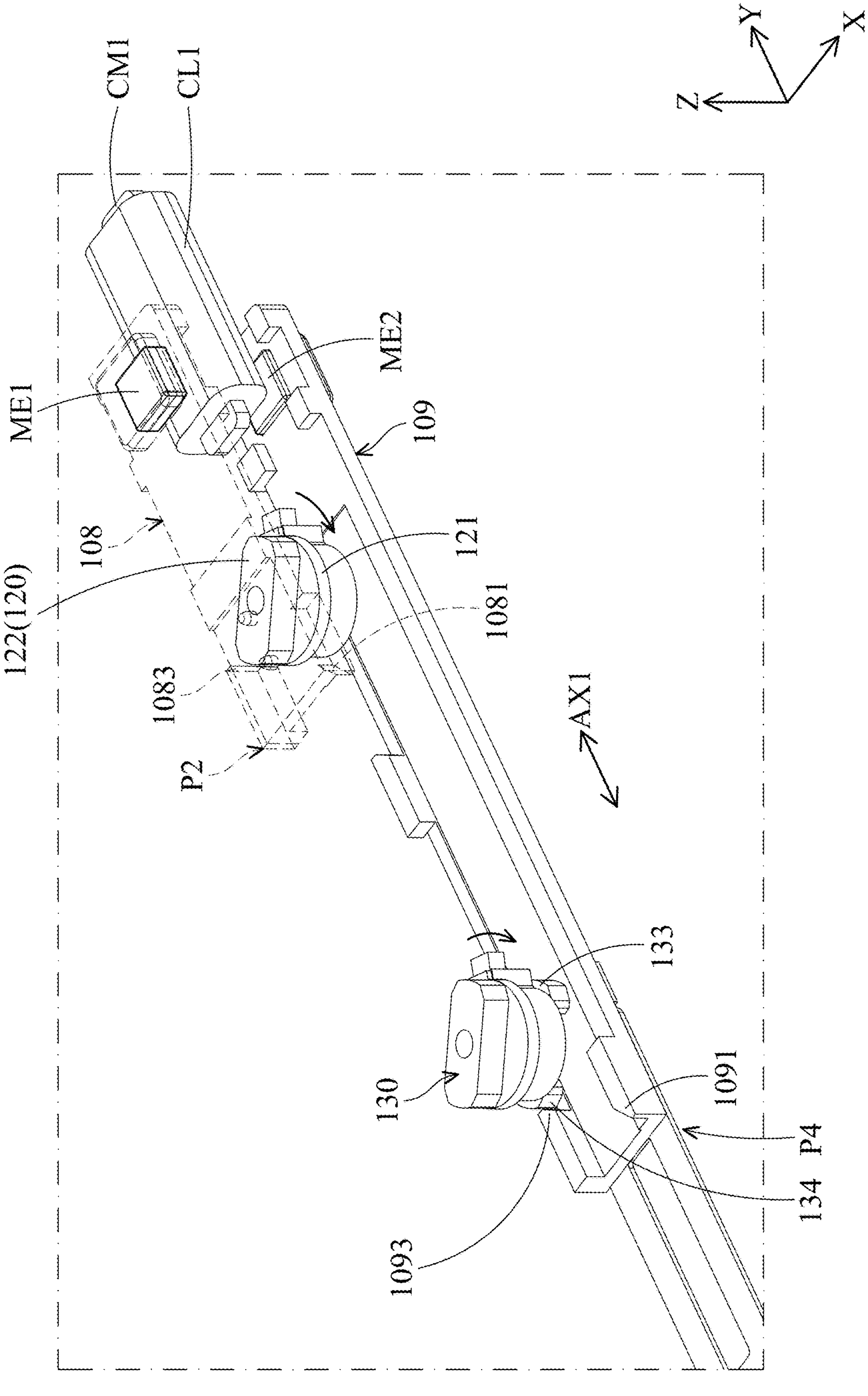
FIG. 7 is a perspective view illustrating that the first positioning element 120 positions the first movable part 108 in a second position P2 and the second positioning element 130 positions the second movable part 109 in a fourth position P4 according to an embodiment of the present disclosure.
Figure 8:
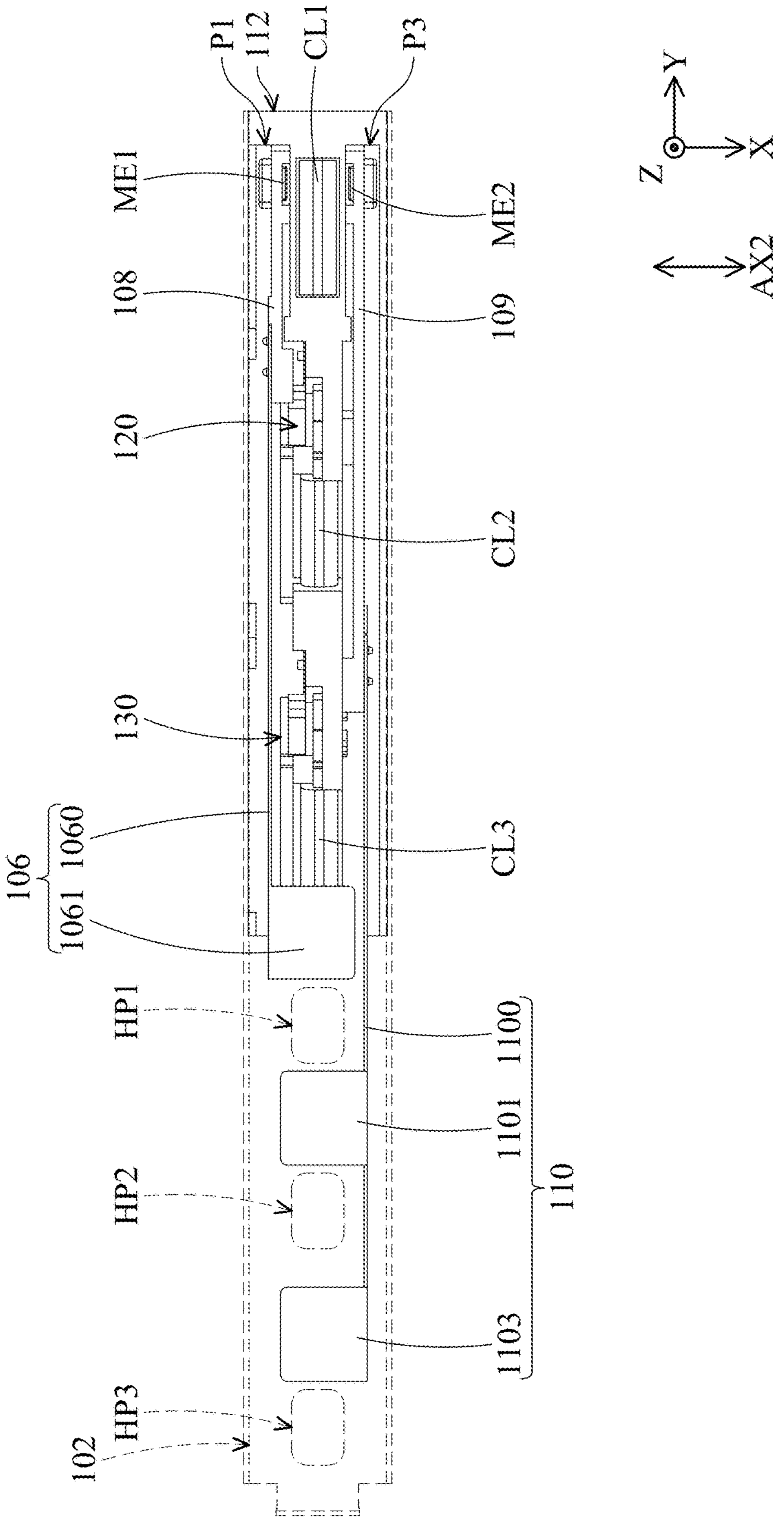
FIG. 8 is a top view illustrating that the first movable part 108 is located in the first position P1 and the second movable part 109 is located in the third position P3 according to an embodiment of the present disclosure.

Next, please refer to FIG. 3 and FIG. 5 to FIG. 8. FIG. 5 is a perspective view illustrating that the first positioning element 120 positions the first movable part 108 in a first position P1 and the second positioning element 130 positions the second movable part 109 in a third position P3 according to an embodiment of the present disclosure. FIG. 6 is a perspective view illustrating that the first positioning element 120 is located in a first release position and the second positioning element 130 is located in a second release position according to an embodiment of the present disclosure. FIG. 7 is a perspective view illustrating that the first positioning element 120 positions the first movable part 108 in a second position P2 and the second positioning element 130 positions the second movable part 109 in a fourth position P4 according to an embodiment of the present disclosure. FIG. 8 is a top view illustrating that the first movable part 108 is located in the first position P1 and the second movable part 109 is located in the third position P3 according to an embodiment of the present disclosure.

As shown in FIG. 3, the magnetic poles of the first magnetic element ME1 and the second magnetic element ME2 are arranged in opposite directions. That is, the order in which a first N-pole NP1 and a first S-pole SP1 of the first magnetic element ME1 are arranged is the opposite of the order in which a second N-pole NP2 and a second S-pole SP2 of the second magnetic element ME2 are arranged.

For example, the first N-pole NP1 and the first S-pole SP1 are arranged along the −X-axis, and the second N-pole NP2 and the second S-pole SP2 are arranged along the +X-axis. Based on this configuration, when the first coil CL1 is energized, the directions of the first driving force and the second driving force are the same, so that the moving directions of the first movable part 108 and the second movable part 109 are also the same.

Furthermore, in this embodiment, as shown in FIG. 5 and FIG. 8, when the first coil CL1, the second coil CL2 and the third coil CL3 are not energized, the first movable part 108 can be located in the first position P1, and the second movable part 109 can be located in the third position P3. At this time, the first positioning element 120 is located in a first lock position, and the second positioning element 130 is located in a second lock position.

As shown in FIG. 5, the first movable part 108 has a first stop portion 1081. When the first movable part 108 is located in the first position P1, and the first positioning element 120 is located in the first lock position, the first positioning portion 122 is in contact with the first stop portion 1081. The first stop portion 1081 is, for example, a protruding block, having a slope structure (but it is not limited thereto), and is configured to be in contact with the first positioning portion 122.

Similarly, the second movable part 109 has a third stop portion 1091. When the second movable part 109 is located in the third position P3, and when the second positioning element 130 is located in the second lock position, the second positioning portion 133 is in contact with the third stop portion 1091. The third stop portion 1091 is, for example, a protruding block, having a slope structure, but it is not limited thereto.

As shown in FIG. 8, when the first positioning element 120 of the positioning assembly PA positions the first movable part 108 in the first position P1, the first blocking portion 1061 does not block the first opening HP1. Similarly, when the second positioning element 130 of the positioning assembly PA positions the second movable part 109 in the third position P3, the second blocking portion 1101 does not block the second opening HP2, and the third blocking portion 1103 does not block the third opening HP3.

Next, when the second coil CL2 is energized, the first positioning element 120 is driven to rotate from the first lock position in FIG. 5 to a first release position in FIG. 6, and when the third coil CL3 is energized, the second positioning element 130 is driven to rotate from the second lock position in FIG. 5 to a second release position in FIG. 6.

Next, when the first coil CL1 is energized, the first magnetic element ME1 is configured to drive the first movable part 108 to move along the first axis AX1. Specifically, the first magnetic element ME1 acts with the first coil CL1 to drive the first movable part 108 to move from the first position P1 in FIG. 6 to the second position P2 in FIG. 7.

In addition, when the first coil CL1 is energized, the second magnetic element ME2 is configured to drive the second movable part 109 to move along the first axis AX1. Specifically, the second magnetic element ME2 acts the first coil CL1 to drive the second movable part 109 to move from the third position P3 in FIG. 6 to the fourth position P4 in FIG. 7.

Then, the second coil CL2 is energized again, so that the first positioning element 120 is driven to rotate from the first release position in FIG. 6 to the first lock position in FIG. 7, and the third coil CL3 can also be energized again, so that the second positioning element 130 is driven to rotate from the second release position in FIG. 6 to the second lock position in FIG. 7.

As shown in FIG. 7, the first movable part 108 may further have a second stop portion 1083. When the first movable part 108 is located in the second position P2, and when the first positioning element 120 is located in the first lock position, the first positioning portion 122 is in contact with the second stop portion 1083. The second stop portion 1083 is, for example, a protruding block, having a slope structure (but it is not limited thereto), and is configured to be in contact with the first positioning portion 122.

Similarly, the second movable part 109 may have a fourth stop portion 1093. When the second movable part 109 is located in the fourth position P4, and when the second positioning element 130 is located in the second lock position, the third positioning portion 134 is in contact with the fourth stop portion 1093. The fourth stop portion 1093 is, for example, a protruding block, having a slope structure, but it is not limited thereto. At this time, the first coil CL1 may stop being energized, so that the first movable part 108 is positioned in the second position P2, and the second movable part 109 is positioned in the fourth position P4.

In this embodiment, the slope structure of the first stop portion 1081 may be parallel to the slope structure of the third stop portion 1091, and the slope structure of the first stop portion 1081 may not be parallel to the slope structure of the second stop portion 1083. The slope structure of the second stop portion 1083 may be parallel to the slope structure of the fourth stop portion 1093, and the slope structure of the third stop portion 1091 may not be parallel to the slope structure of the fourth stop portion 1093, but they are not limited thereto.

Figure 9:
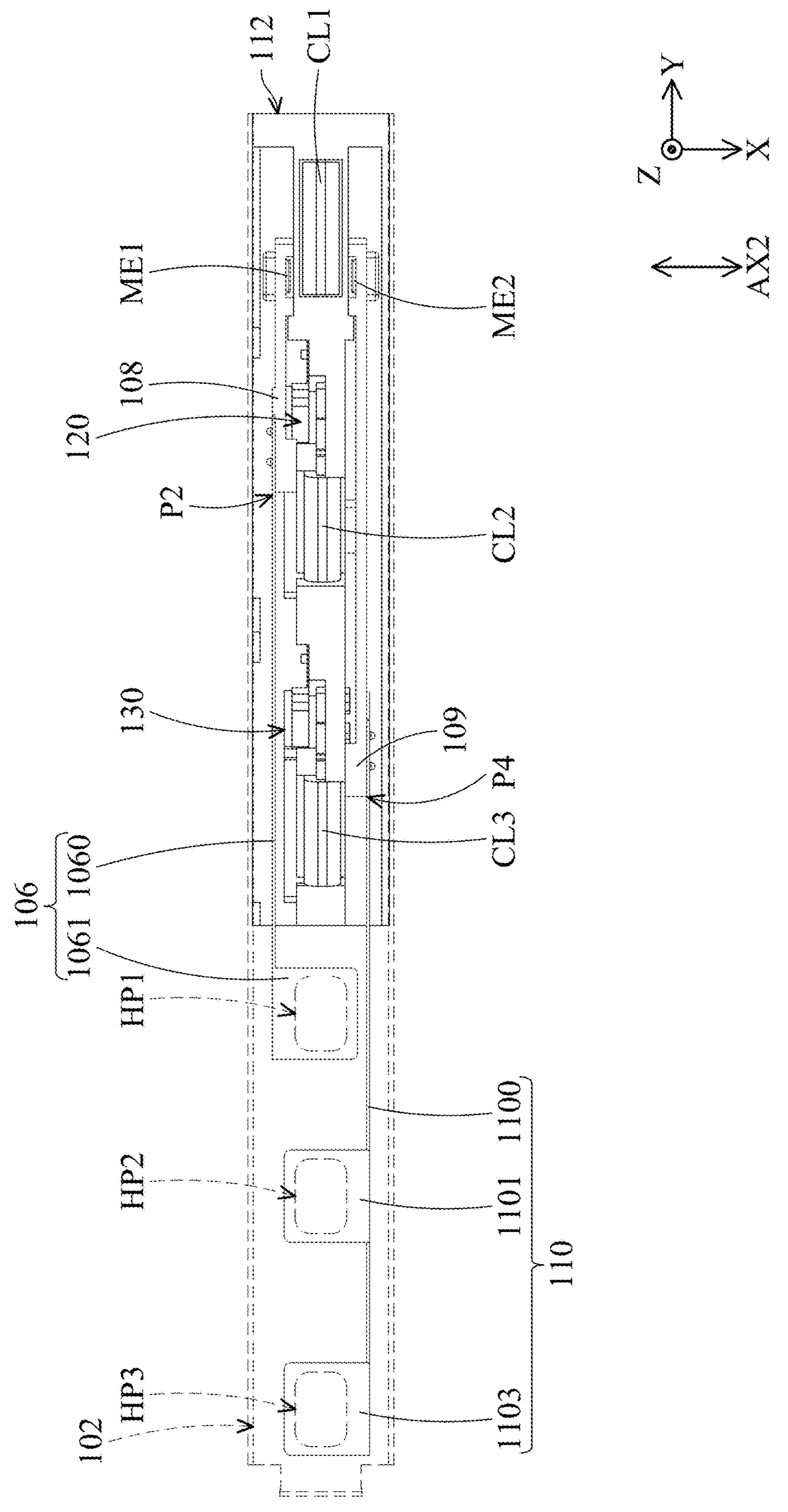
FIG. 9 is a top view illustrating that the first movable part 108 is located in the second position P2 and the second movable part 109 is located in the fourth position P4 according to an embodiment of the present disclosure.

Furthermore, please refer to FIG. 9. FIG. 9 is a top view illustrating that the first movable part 108 is located in the second position P2 and the second movable part 109 is located in the fourth position P4 according to an embodiment of the present disclosure. When the first positioning element 120 of the positioning assembly PA positions the first movable part 108 in the second position P2, the first blocking portion 1061 blocks the first opening HP1.

At the same time, when the second positioning element 130 of the positioning assembly PA positions the second movable part 109 in the fourth position P4, the second blocking portion 1101 blocks the second opening HP2, and the third blocking portion 1103 blocks the third opening HP3.

Figure 10:
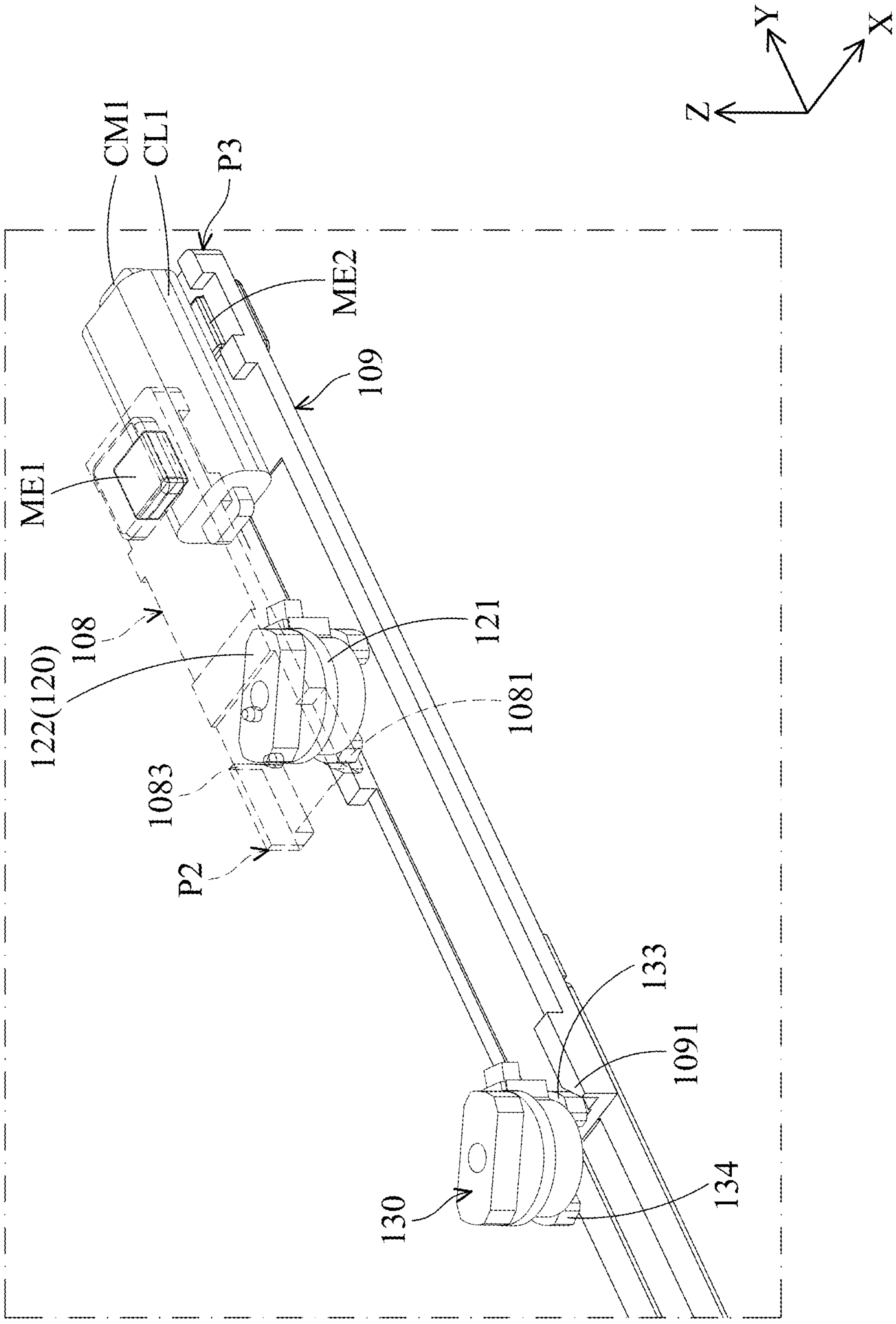
FIG. 10 is a perspective view illustrating that the first positioning element 120 positions the first movable part 108 in the second position P2 and the second positioning element 130 positions the second movable part 109 in the third position P3 according to an embodiment of the present disclosure.
Figure 11:
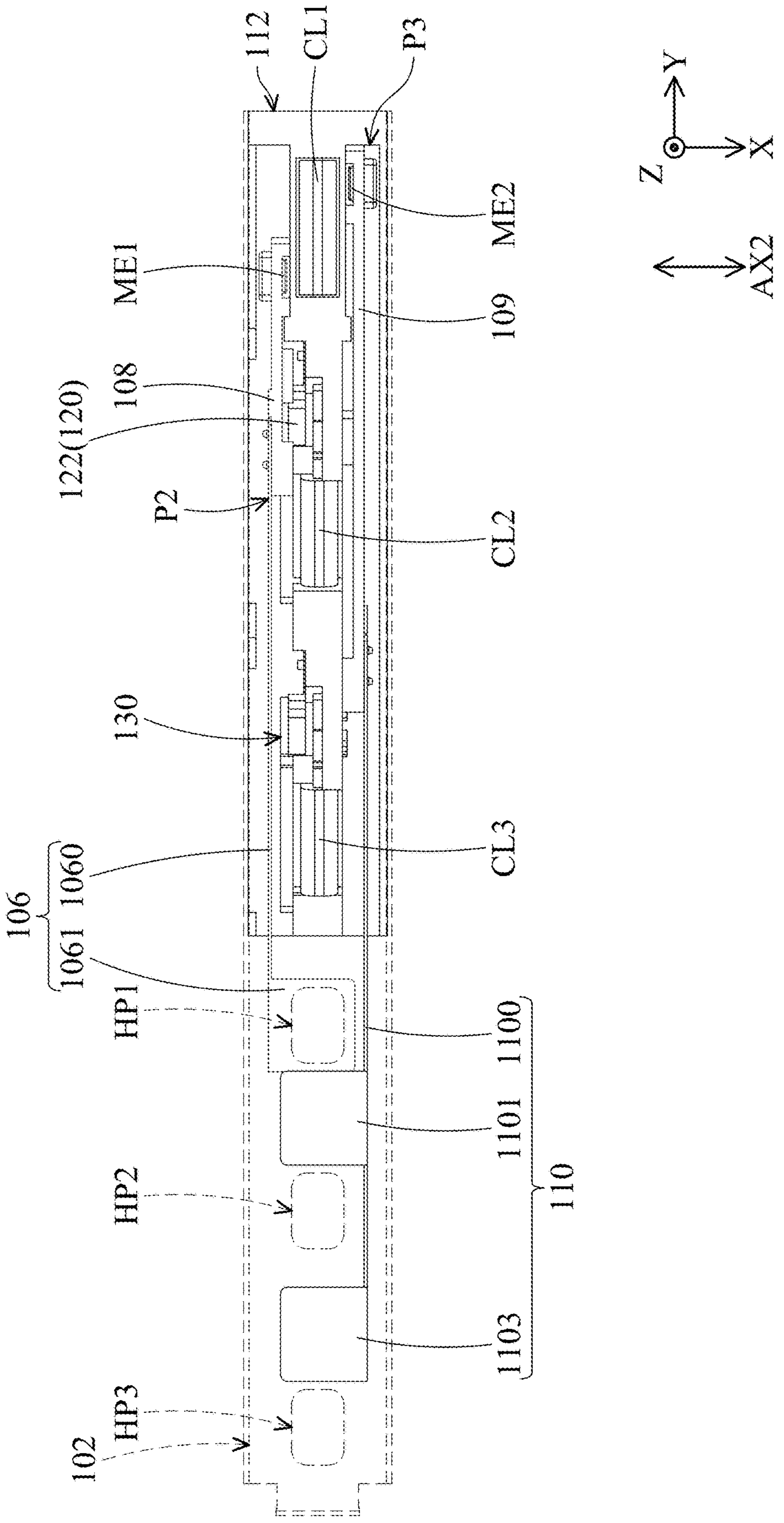
FIG. 11 is a top view illustrating that the first movable part 108 is located in the second position P2 and the second movable part 109 is located in the third position P3 according to an embodiment of the present disclosure.

It is worth noting that the first positioning element 120 and the second positioning element 130 can act independently. For example, please refer to FIG. 10 and FIG. 11. FIG. 10 is a perspective view illustrating that the first positioning element 120 positions the first movable part 108 in the second position P2 and the second positioning element 130 positions the second movable part 109 in the third position P3 according to an embodiment of the present disclosure. FIG. 11 is a top view illustrating that the first movable part 108 is located in the second position P2 and the second movable part 109 is located in the third position P3 according to an embodiment of the present disclosure.

In this embodiment, the first positioning element 120 in FIG. 5 can independently rotates to the first release position to release the first movable part 108, so that the first movable part 108 can move from the first position P1 in FIG. 5 to the second position P2 in FIG. 10, and at the same time, the second positioning element 130 remains in the second lock position to lock the second movable part 109, so that the second movable part 109 is still positioned in the third position P3.

Therefore, as shown in FIG. 11, the first blocking portion 1061 can block the first opening HP1, and the second blocking portion 1101 and the third blocking portion 1103 do not block the second opening HP2 and the third opening HP3. As a result, the optical element driving mechanism 100 can be used in different usage scenarios. The state of FIG. 11 may be called a third usage scenario, the state of FIG. 8 may be called a first usage scenario, and the state of FIG. 9 may be called a second usage scenario.

For example, in the third usage scenario, the first opening HP1 can be blocked and the second opening HP2 and the third opening HP3 can be opened, so that the second optical module 155 and the third optical module 160 can perform the infrared sensing function. In addition, if it is desired to perform all the functions of the first optical module 150 to the third optical module 160, the optical element driving mechanism 100 can be controlled to operate in the first usage scenario in FIG. 8, so that the first openings HP1 to the third Open HP3 are all open. On the contrary, if it is desired to turn off the functions of the first optical module 150 to the third optical module 160, the optical element driving mechanism 100 can be controlled to operate in the second usage scenario in FIG. 9, so that the first opening HP1 to the third opening HP3 are all blocked.

Figure 12:
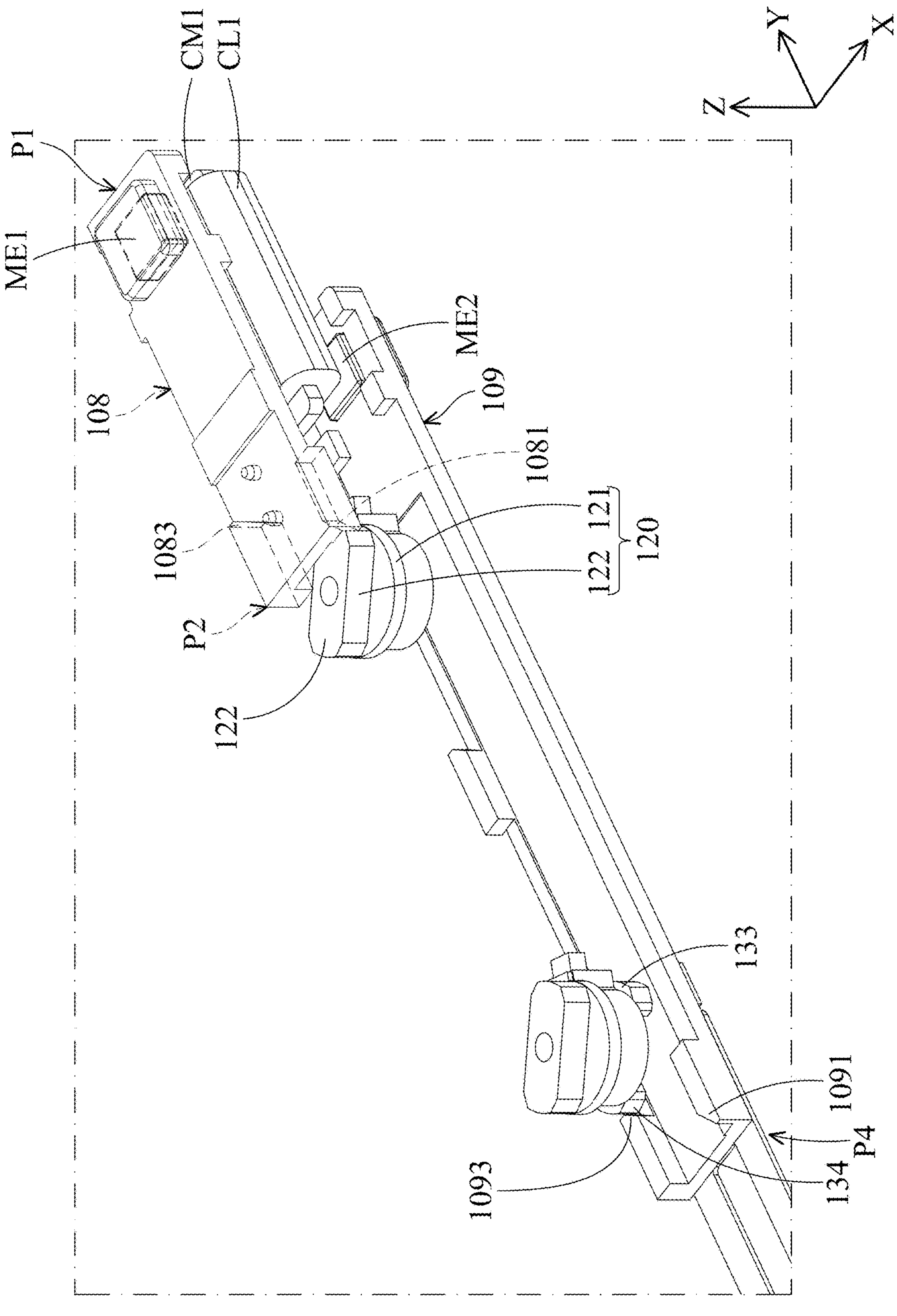
FIG. 12 is a perspective view illustrating that the first positioning element 120 positions the first movable part 108 in the first position P1 and the second positioning element 130 positions the second movable part 109 in the fourth position P4 according to an embodiment of the present disclosure.
Figure 13:
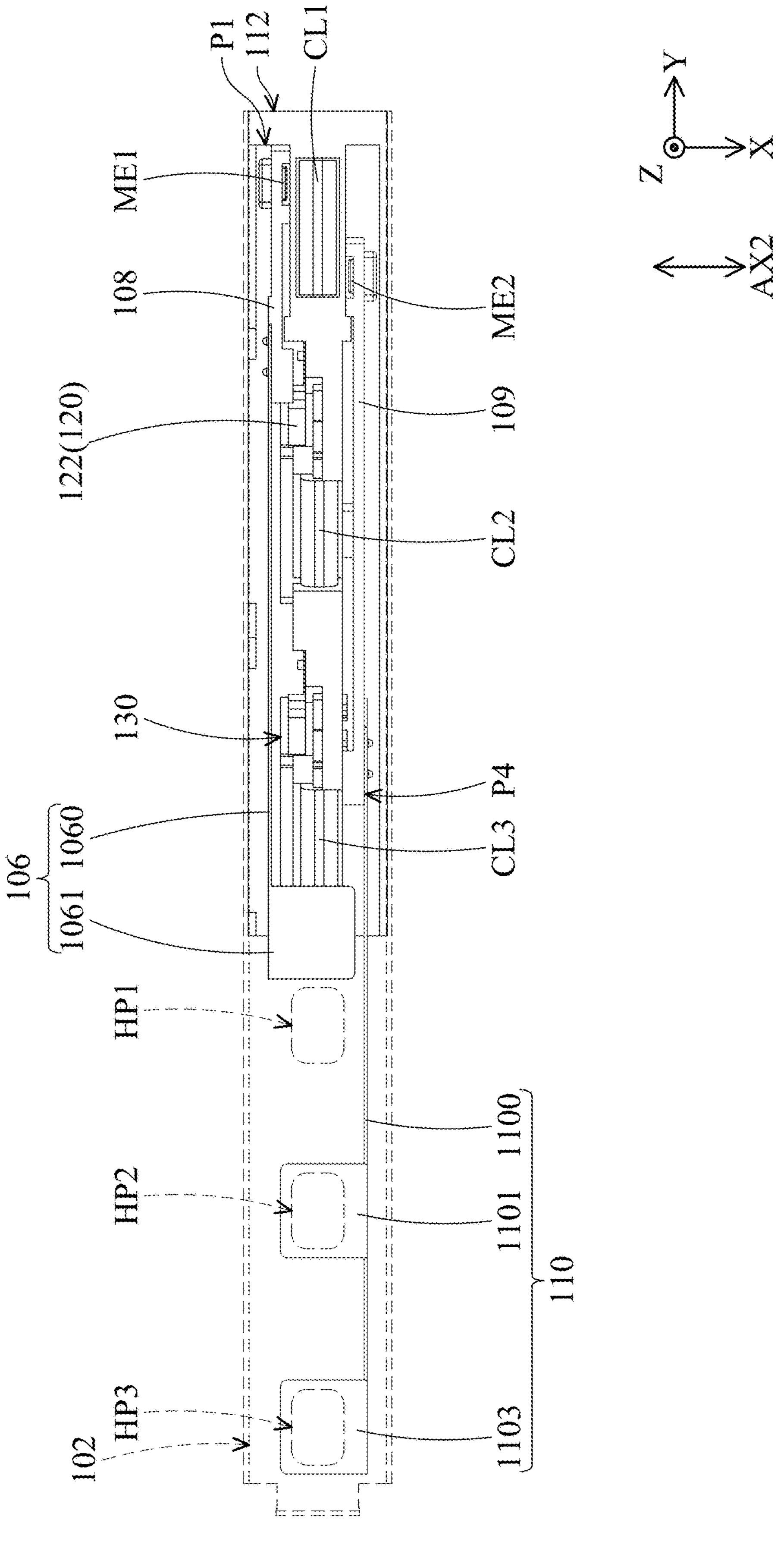
FIG. 13 is a top view illustrating that the first movable part 108 is located in the first position P1 and the second movable part 109 is located in the fourth position P4 according to an embodiment of the present disclosure.

Furthermore, on the other hand, please refer to FIG. 12 and FIG. 13. FIG. 12 is a perspective view illustrating that the first positioning element 120 positions the first movable part 108 in the first position P1 and the second positioning element 130 positions the second movable part 109 in the fourth position P4 according to an embodiment of the present disclosure. FIG. 13 is a top view illustrating that the first movable part 108 is located in the first position P1 and the second movable part 109 is located in the fourth position P4 according to an embodiment of the present disclosure.

In this embodiment, the second positioning element 130 in FIG. 5 can independently rotates to the second release position to release the second movable part 109, so that the second movable part 109 can move from the third position P3 in FIG. 5 to the fourth position P4 in FIG. 12, and at the same time, the first positioning element 120 remains in the first lock position to lock the first movable part 108, so that the first movable part 108 is still positioned in the first position P1.

Therefore, as shown in FIG. 13, the first blocking portion 1061 may not block the first opening HP1, and the second blocking portion 1101 and the third blocking portion 1103 block the second opening HP2 and the third opening HP3 respectively. As a result, the optical element driving mechanism 100 can be used in different usage scenarios. The state in FIG. 13 can be called the fourth usage scenario. When it is desired to enable the first optical module 150 alone for capturing image, the optical element driving mechanism 100 can be controlled to operate in the fourth usage scenario in FIG. 13.

Furthermore, the method to achieve the fourth usage scenario is not limited to this. For example, the first positioning element 120 in FIG. 7 can independently release the first movable part 108, and then the driving assembly DA drives the first movable part 108 to move from the second position P2 in FIG. 7 to the first position P1 in FIG. 12. Similarly, other usage scenarios can also be achieved in similar ways, and therefore they are not described again herein.

Based on the above configuration and design of the present disclosure, in the present disclosure, the positioning assembly PA can selectively position the first movable part 108 in the first position P1, and position the second movable part 109 in the third position P3, or the positioning assembly PA may selectively position the first movable part 108 in the second position P2, and position the second movable part 109 in the third position P3, or the positioning assembly PA may selectively position the first movable part 108 in the first position P1, and position the second movable part 109 in the fourth position P4, or the positioning assembly PA can selectively position the first movable part 108 in the second position P2, and position the second movable part 109 in the fourth position P4.

Figure 14:
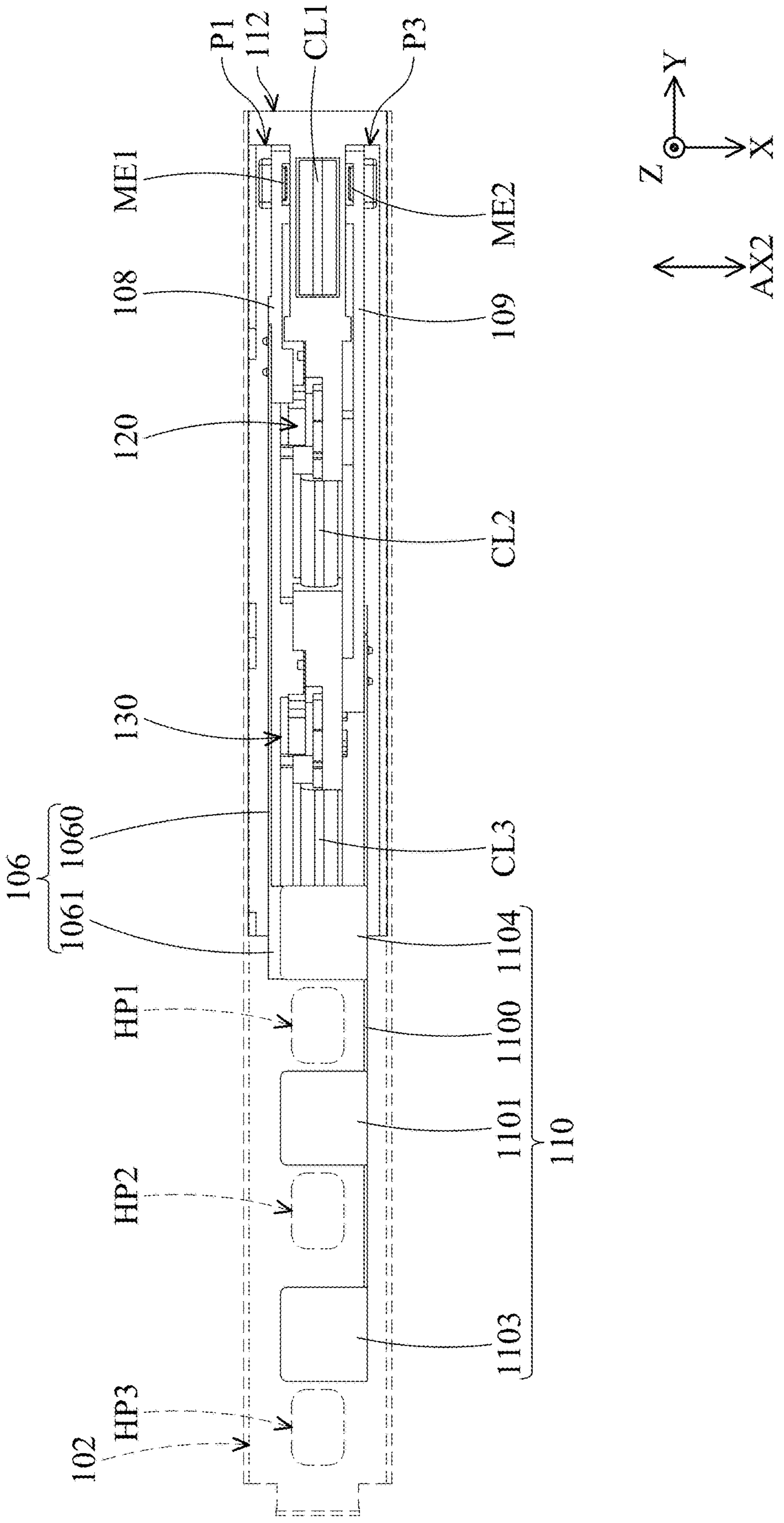
FIG. 14 is a top view illustrating that the first movable part 108 is located in the first position P1 and the second movable part 109 is located in the third position P3 according to another embodiment of the present disclosure.
Figure 15:
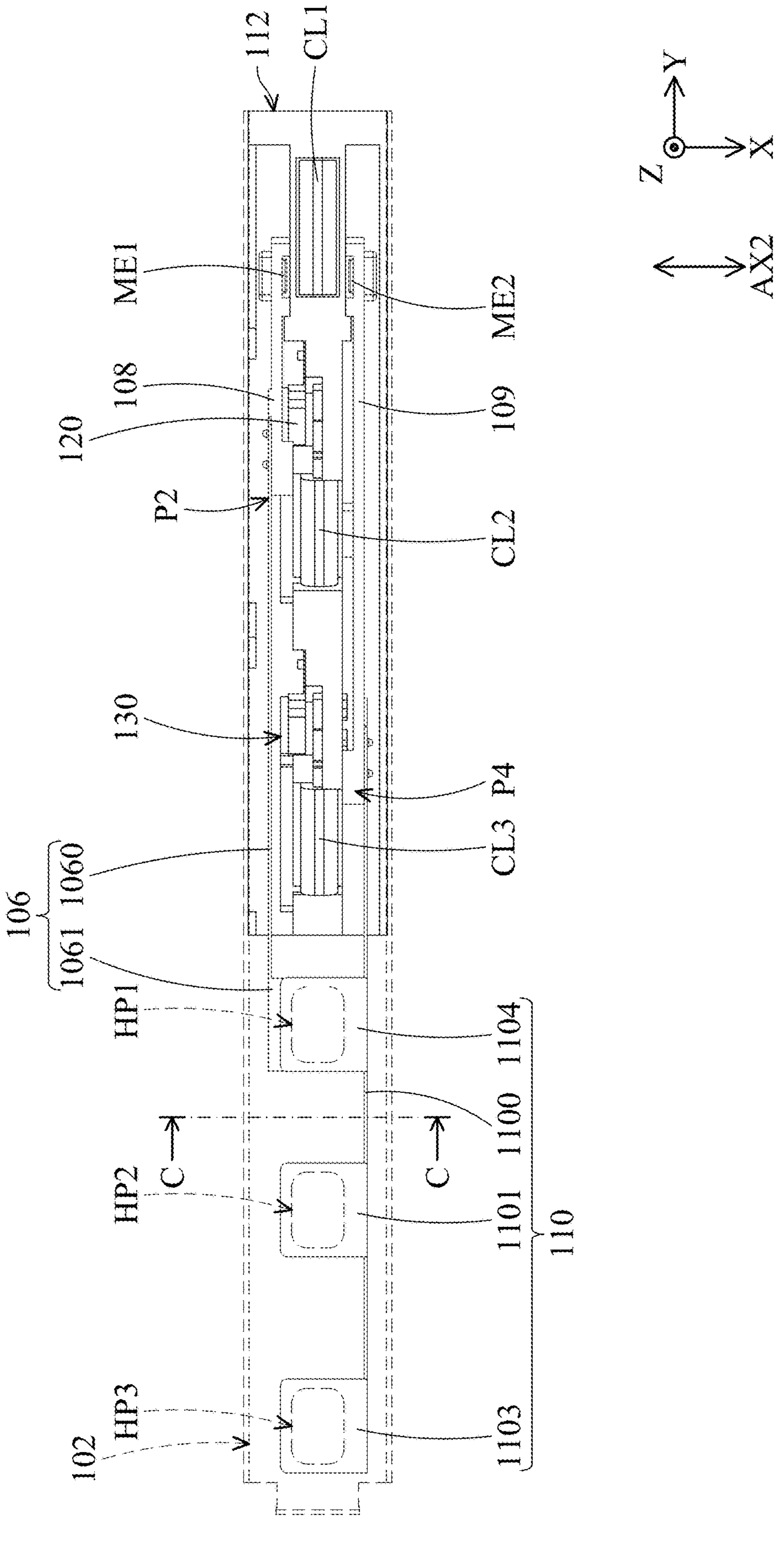
FIG. 15 is a top view illustrating that the first movable part 108 is located in the second position P2 and the second movable part 109 is located in the fourth position P4 according to another embodiment of the present disclosure.
Figure 16:
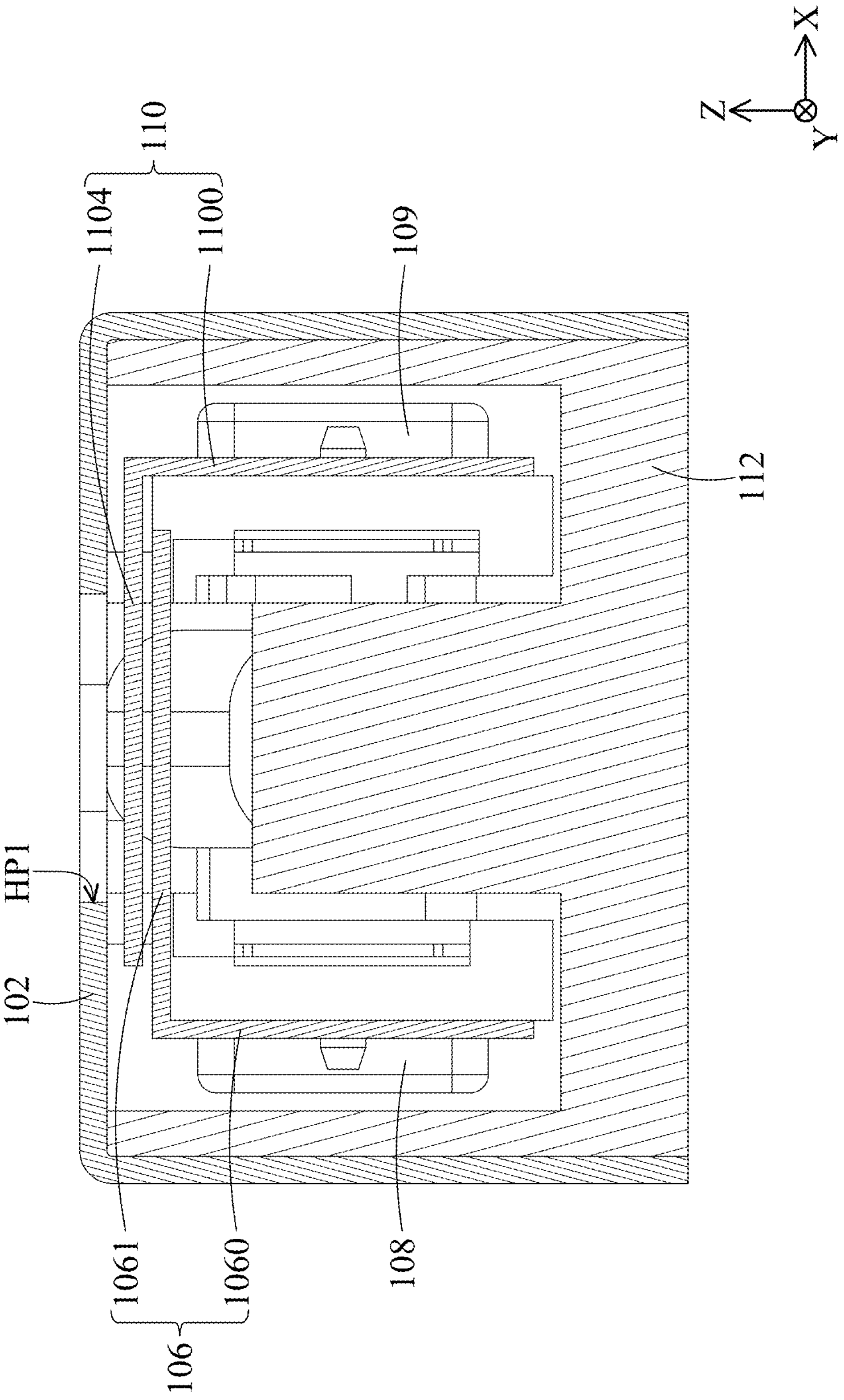
FIG. 16 is a cross-sectional view of the optical element driving mechanism 100 along the line C-C in FIG. 15 according to another embodiment of the present disclosure.

Next, please refer to FIG. 14 to FIG. 16. FIG. 14 is a top view illustrating that the first movable part 108 is located in the first position P1 and the second movable part 109 is located in the third position P3 according to another embodiment of the present disclosure. FIG. 15 is a top view illustrating that the first movable part 108 is located in the second position P2 and the second movable part 109 is located in the fourth position P4 according to another embodiment of the present disclosure. FIG. 16 is a cross-sectional view of the optical element driving mechanism 100 along the line C-C in FIG. 15 according to another embodiment of the present disclosure.

In this embodiment, as shown in FIG. 14, the second optical element 110 may have a fourth blocking portion 1104, and the fourth blocking portion 1104 extends from the second base portion 1100 along the second axis AX2.

As shown in FIG. 14, when viewed along the third axis AX3 (the Z-axis), the second blocking portion 1101 is located between the third blocking portion 1103 and the fourth blocking portion 1104. When the first movable part 108 is located in the first position P1 and the second movable part 109 is located in the third position P3, the fourth blocking portion 1104 does not block the first opening HP1.

When the first movable part 108 moves from the first position P1 in FIG. 14 to the second position P2 in FIG. 15, and the second movable part 109 moves from the third position P3 in FIG. 14 to the fourth position P4 in FIG. 15, the fourth blocking portion 1104 overlaps the first blocking portion 1061 and the first opening HP1. That is, at this time, the fourth blocking portion 1104 and the first blocking portion 1061 block the first opening HP1 together.

For example, in this embodiment, the fourth blocking portion 1104 is a filter that can filter blue light, and the first blocking portion 1061 is a filter that can filter green light, so that the first optical module 150 can receive pure red light. The applications of the fourth blocking portion 1104 and the first blocking portion 1061 are not limited to this embodiment.

In addition, it is worth noting that, as shown in FIG. 16, when viewed along the first axis AX1 (the Y-axis), the fourth blocking portion 1104 does not overlap the first blocking portion 1061. Based on this configuration, it can be ensured that the first optical element 106 does not collide with the second optical element 110, thereby affecting the smoothness of the movement of the first movable part 108 and the second movable part 109.

The present disclosure provides an optical element driving mechanism 100, which includes a fixed assembly FA, a first movable part 108, a second movable part 109 and a driving assembly DA. The driving assembly DA is configured to drive the first movable part 108 and the second movable part 109 to move relative to the fixed assembly FA, so that the first movable part 108 drives the first optical element 106 to move to selectively shield the first opening HP1 of the fixed assembly FA, and the second movable part 109 drives the second optical element 110 to move to selectively shield the second opening HP2 and the third opening HP3 of the fixed assembly FA.

In the present disclosure, the first positioning element 120 and the second positioning element 130 can act independently, so that the first movable part 108 and the second movable part 109 can move along the first axis AX1 alone or together. Based on this configuration, the optical element driving mechanism 100 can be used in four different usage scenarios to meet the different needs of users.

Based on the above configuration, the optical element driving mechanism 100 can be used in various usage scenarios. In addition, because the first movable part 108 and the second movable part 109 share the same driving assembly, the overall volume of the optical element driving mechanism 100 can be reduced to achieve miniaturization. In addition, because the multiple blocking portions are distributed on two movable parts, the weight of a single movable part can be reduced, so that the movement of the two movable parts can be more stable.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed assembly;
a first movable part, configured to be connected to a first optical element, wherein the first movable part is movable relative to the fixed assembly; and
a driving assembly, configured to drive the first movable part to move relative to the fixed assembly,
wherein the fixed assembly includes an outer frame and a base;
the outer frame is fixedly connected to the base;
the outer frame has a first opening and a second opening;
the first opening and the second opening are arranged along a first axis;
wherein the first optical element has a first base portion and a first blocking portion;
the first base portion extends along the first axis;
a first open slot is formed on the first base portion;
the first blocking portion bends from the first base portion to extend along a second axis; and
the first blocking portion extends from the first base portion in a first extending direction.

2. The optical element driving mechanism as claimed in claim 1, wherein
the optical element driving mechanism further includes a second movable part configured to be connected to a second optical element, and the second movable part is movable relative to the first movable part;
when a driving signal is input to the driving assembly, the driving assembly generates a first driving force to the first movable part, and the driving assembly generates a second driving force to the second movable part at the same time.

3. The optical element driving mechanism as claimed in claim 2, wherein
the second optical element has a second base portion and a second blocking portion;
the second base portion extends along the first axis;
a second open slot is formed on the second base portion;
a length of the first open slot is greater than a length of the second open slot;
the second blocking portion extends from the second base portion along the second axis;
the second blocking portion extends from the second base portion in a second extending direction;
the second extending direction is opposite to the first extending direction;
the first movable part is configured to move along the first axis so that the first blocking portion selectively blocks the first opening; and
the second movable part is configured to move along the first axis so that the second blocking portion selectively blocks the second opening.

4. The optical element driving mechanism as claimed in claim 3, wherein
the optical element driving mechanism further includes a positioning assembly;
the positioning assembly and the driving assembly are arranged along the first axis;
when viewed along a third axis, the first movable part and the second movable part are located on opposite sides of the driving assembly;
the third axis, the second axis and the first axis are perpendicular to each other;

the positioning assembly selectively positions the first movable part in a first position and positions the second movable part in a third position;

the positioning assembly selectively positions the first movable part in a second position and positions the second movable part in the third position;

the positioning assembly selectively positions the first movable part in the first position and positions the second movable part in a fourth position; and the positioning assembly selectively positions the first movable part in the second position and positions the second movable part in the fourth position.

5. The optical element driving mechanism as claimed in claim 4, wherein when the positioning assembly positions the first movable part in the first position, the first blocking portion does not block the first opening;

when the positioning assembly positions the first movable part in the second position, the first blocking portion blocks the first opening;

when the positioning assembly positions the second movable part in the third position, the second blocking portion does not block the second opening; and when the positioning assembly positions the second movable part in the fourth position, the second blocking portion blocks the second opening.

6. The optical element driving mechanism as claimed in claim 5, wherein the driving assembly includes a first coil, a first magnetically conductive element, a first magnetic element and a second magnetic element;

the first magnetic element corresponds to the first coil and is disposed on the first movable part;

the second magnetic element corresponds to the first coil and is disposed on the second movable part;

the first magnetically conductive element corresponds to the first coil;

the first magnetically conductive element has magnetically conductive material and has a long strip-shaped structure; and the first coil is wound on the first magnetically conductive element.

7. The optical element driving mechanism as claimed in claim 6, wherein the positioning assembly includes a first positioning element, a second coil and a second magnetically conductive element;

the first positioning element is movably disposed on the base;

the second coil corresponds to the second magnetically conductive element;

the second magnetically conductive element has a clamp-shaped structure; and the second coil is wound on the second magnetically conductive element.

8. The optical element driving mechanism as claimed in claim 7, wherein the first positioning element has magnetically conductive material;

when the second coil is energized, the first positioning element rotates around a first rotating axis relative to the second magnetically conductive element and the base;

the first positioning element has a first central portion and a first positioning portion;

the first positioning portion is disposed on the first central portion;

the first positioning portion has a long strip-shaped structure configured to selectively stop the first movable part; and the base further has a first positioning shaft which is inserted into the first central portion.

9. The optical element driving mechanism as claimed in claim 8, wherein the positioning assembly further includes a second positioning element, a third coil and a third magnetically conductive element;

the second positioning element is movably disposed on the base;

the third coil corresponds to the third magnetically conductive element;

the third magnetically conductive element has a clamp-shaped structure; and the third coil is wound on the third magnetically conductive element.

10. The optical element driving mechanism as claimed in claim 9, wherein the second positioning element has magnetically conductive material;

when the third coil is energized, the second positioning element rotates around a second rotating axis relative to the third magnetically conductive element and the base;

the second positioning element has a second central portion, a second positioning portion and a third positioning portion;

the second positioning portion and the third positioning portion are disposed on one side of the second central portion and face the second movable part; and the base has a second positioning shaft which is inserted into the second central portion.

11. The optical element driving mechanism as claimed in claim 10, wherein the second positioning shaft is located between the second positioning portion and the third positioning portion;

the second positioning portion and the third positioning portion have arc structures configured to selectively stop the second movable part; and the base further has two arc grooves, and the second positioning portion and the third positioning portion respectively pass through the two arc grooves.

12. The optical element driving mechanism as claimed in claim 11, wherein the first movable part has a first stop portion and a second stop portion;

when the first movable part is located in the first position, and when the first positioning element is located in a first lock position, the first positioning portion is in contact with the first stop portion;

the second movable part has a third stop portion and a fourth stop portion; and when the second movable part is located in the third position, and when the second positioning element is located in a second lock position, the second positioning portion is in contact with the third stop portion.

13. The optical element driving mechanism as claimed in claim 12, wherein when the first coil is energized, the first magnetic element is configured to drive the first movable part to move along the first axis;

when the second coil is energized, the first positioning element rotates from the first lock position to a first release position, so that the first movable part moves from the first position to the second position;

when the first coil is energized, the second magnetic element is configured to drive the second movable part to move along the first axis; and when the third coil is energized, the second positioning element rotates from the second lock position to a second release position, so that the second movable part moves from the third position to the fourth position.

14. The optical element driving mechanism as claimed in claim 13, wherein when the first movable part is located in the second position, and when the first positioning element is located in the first lock position, the first positioning portion is in contact with the second stop portion; and when the second movable part is located in the fourth position, and when the second positioning element is located in the second lock position, the third positioning portion is in contact with the fourth stop portion.

15. The optical element driving mechanism as claimed in claim 14, wherein each of the first stop portion to the fourth stop portion has a slope structure;

the slope structure of the first stop portion is parallel to the slope structure of the third stop portion;

the slope structure of the first stop portion is not parallel to the slope structure of the second stop portion;

the slope structure of the second stop portion is parallel to the slope structure of the fourth stop portion; and the slope structure of the third stop portion is not parallel to the slope structure of the fourth stop portion.

16. The optical element driving mechanism as claimed in claim 11, wherein the first positioning element is disposed on a first supporting portion of the base;

the first central portion does not penetrate the first supporting portion; and when viewed along the second axis, the first central portion is exposed from the first supporting portion.

17. The optical element driving mechanism as claimed in claim 16, wherein the second positioning element is disposed on a second supporting portion of the base;

a portion of the second positioning element passes through the second supporting portion; and when viewed along the second axis, the second positioning portion and the third positioning portion are exposed from the second supporting portion.

18. The optical element driving mechanism as claimed in claim 5, wherein the outer frame further has a third opening, and the second opening is located between the first opening and the third opening;

the second optical element further has a third blocking portion;

the third blocking portion extends from the second base portion along the second axis;

the third blocking portion of the second optical element selectively blocks the third opening;

when the positioning assembly positions the second movable part in the third position, the third blocking portion does not block the third opening; and when the positioning assembly positions the second movable part in the fourth position, the third blocking portion blocks the third opening.

19. The optical element driving mechanism as claimed in claim 18, wherein the second optical element has a fourth blocking portion;

the fourth blocking portion extends from the second base portion along the second axis;

when viewed along the third axis, the second blocking portion is located between the third blocking portion and the fourth blocking portion;

when the first movable part is located in the second position and the second movable part is located in the fourth position, the fourth blocking portion overlaps the first blocking portion and the first opening; and when viewed along the first axis, the fourth blocking portion does not overlap the first blocking portion.

* * * * *